(12) United States Patent
Hirabayashi et al.

(10) Patent No.: US 8,821,047 B2
(45) Date of Patent: Sep. 2, 2014

(54) PRINTING SYSTEM WITH PERIODIC ACQUISITION OF TAPE WIDTH FOR DISPLAYING ON DISPLAY SCREEN, PRINT DATA GENERATING DEVICE, METHOD OF CONTROLLING PRINT DATA GENERATING DEVICE AND PROGRAM PRODUCT

(75) Inventors: Naofumi Hirabayashi, Suwa (JP); Makoto Takada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 13/534,882

(22) Filed: Jun. 27, 2012

(65) Prior Publication Data

US 2013/0004223 A1 Jan. 3, 2013

(30) Foreign Application Priority Data

Jul. 1, 2011 (JP) ................................ 2011-147118

(51) Int. Cl.
*B41J 29/38* (2006.01)
*G06F 3/12* (2006.01)

(52) U.S. Cl.
CPC ............ *G06F 3/1232* (2013.01); *G06F 3/1208* (2013.01); *G06F 3/1255* (2013.01); *G06F 3/1292* (2013.01); *G06F 3/1285* (2013.01)
USPC .......................................... 400/76; 358/1.2

(58) Field of Classification Search
CPC ... B41J 3/4075; G06K 15/022; G06F 15/0233
USPC ....................................... 400/76, 88; 358/1.2
See application file for complete search history.

(56) References Cited

U.S. PATENT DOCUMENTS

| 5,496,119 | A | * | 3/1996 | Kawakami et al. ............. 400/70 |
| 7,864,375 | B2 | | 1/2011 | Kajihara |
| 2002/0001010 | A1 | * | 1/2002 | Abe ................................ 347/19 |
| 2002/0006303 | A1 | * | 1/2002 | Yamaguchi et al. ........ 400/615.2 |
| 2005/0057761 | A1 | * | 3/2005 | Sakai et al. .................... 358/1.2 |
| 2007/0013950 | A1 | | 1/2007 | Kajihara |
| 2008/0181702 | A1 | * | 7/2008 | Suzuki et al. ................... 400/61 |
| 2009/0056566 | A1 | | 3/2009 | Tanaka et al. |

FOREIGN PATENT DOCUMENTS

| JP | 6-199003 | A | 7/1994 |
| JP | 10-157210 | A | 6/1998 |
| JP | 2005-78128 | A | 3/2005 |
| JP | 2006-289729 | A | 10/2006 |
| JP | 2007-21903 | A | 2/2007 |
| JP | 4483727 | B | 6/2010 |

* cited by examiner

*Primary Examiner* — Daniel J Colilla
(74) *Attorney, Agent, or Firm* — ALG Intellectual Property, LLC (57) ABSTRACT

A printing system includes: a control device configures to generate print data; and a printer configured to print the print data transmitted from the control device on a tape, wherein the control device includes a status information acquisition section for periodically acquiring status information including a tape width of the tape loaded in the printer, a display section for displaying an editing screen of the print data and the status information, and a display control section for performing a display control of the display section, and the display control section performs display control of the display section to display a present tape width based on the latest status information acquired, as the status information, on the display section.

17 Claims, 8 Drawing Sheets

PRINTING SYSTEM WITH PERIODIC ACQUISITION OF TAPE WIDTH FOR DISPLAYING ON DISPLAY SCREEN, PRINT DATA GENERATING DEVICE, METHOD OF CONTROLLING PRINT DATA GENERATING DEVICE AND PROGRAM PRODUCT

CROSS-REFERENCE

The entire disclosure of Japanese Patent Application No. 2011-147118 filed on Jul. 1, 2011, which is hereby incorporated by reference in its entirety.

BACKGROUND

Hitherto, a printing system has been known which includes a data creating device constituted by a personal computer and the like, and a tape printer connected to the data creating device (see Japanese Patent No. 4483727). The data creating device creates print data by displaying an input editing screen, and displays a screen including a tape width display box and a tape width acquisition button that acquires a tape width to display the tape width on the tape width display box, as an input editing screen. When the tape width acquisition button is clicked, a tape width of a print tape mounted to a tape printer is acquired, and the tape width is displayed on the tape width display box.

However, the printing system in the related art is configured to acquire and display the tape width of the mounted print tape when the tape width acquisition button is clicked. Therefore, there is a problem that when the tape width acquisition button is not clicked, a user is not able to recognize the tape width of the print tape currently mounted. That is, when editing of the print data is terminated in a state where the tape width acquisition button is never clicked, or when the print tape is exchanged after the tape width acquisition button is clicked and thus the tape width changes, a user is not able to recognize the tape width of the print tape currently mounted. As a result, a situation occurs where a label is created with an unintended tape width.

SUMMARY

Various embodiments may provide a printing system, a print data generating device, a method of controlling a print data generating device and a program product which allow a user to always recognize the tape width of a tape currently mounted.

At least one embodiment of the disclosure, there is provided a printing system including: a control device that generates print data; and a printer that prints the print data transmitted from the control device on a tape, wherein the control device includes a status information acquisition section that periodically acquires status information including a tape width of the tape loaded in the printer, a display section that displays an editing screen of the print data and the status information, and a display control section that performs a display control of the display section, and the display control section displays a present tape width based on the latest status information acquired, as the status information, on the display section.

At least one embodiment of the disclosure, there is provided a print data generating device that generates print data transmitted to a printer including: a status information acquisition section that periodically acquires status information including a tape width of a tape loaded in the printer; a display section that displays an editing screen of the print data and the status information; and a display control section that performs a display control of the display section, wherein the display control section displays a present tape width based on the latest status information acquired, as the status information, on the display section.

At least one embodiment of the disclosure, there is provided a method of controlling a print data generating device including allowing the print data generating device to perform: status information acquisition which periodically acquires status information including a tape width of a tape loaded in a printer; display of an editing screen of print data transmitted to the printer and the status information; and a display control of the display section, wherein the display control is performed so as to display a present tape width based on the latest status information acquired, as the status information, on the display section.

According to these configurations, the control device (print data generating device) acquires the status information including the tape width, and displays the present tape width based on the acquired latest status information on the display section. Therefore, this display is visually recognized, thereby allowing a user to always recognize the tape width of the tape presently mounted. Consequently, it is possible to prevent a label having an unintended tape width from being created.

It is preferable that the control device further includes a data editing section that determines whether a specific status change occurs on the basis of the acquired status information and/or the presence or absence of acquisition of the status information, and changes setting of a tape width of the print data when the specific status change occurs.

It is preferable that the specific status change includes at least one of a status change in which a status indicating an open-closed state of an openable and closable cover for loading the tape changes from "open" to "closed", and a status change in which a status indicating a power state of the printer changes from "powered off" to "powered on".

According to these configurations, only when the specific status change occurs, the configuration is configured to change the setting of the tape width of the print data. Therefore, when the status change having a possibility of a tape exchange being performed is generated, such as when the opened openable and closable cover is closed or when power of the printer is turned on, the setting of the tape width of the print data can be changed.

It is preferable that the control unit further includes an operation section for instructing the printer to execute printing, and the display control section determines whether the tape width set in the print data and the present tape width are identical to each other when the printer is instructed to execute printing, and displays a dialogue screen that urges exchange of the tape on the display section when the tape width and the present tape width are not identical to each other.

According to the configuration, the dialogue screen is displayed, and thus it is possible to prevent a printing process from being performed in a state where the tape width on the print data and the actual tape width are different from each other.

It is preferable that when the status information indicating the tape width set in the print data is acquired in a state where the dialogue screen is displayed, the control unit further includes a print data transmitting section that transmits the print data to the printer without instructions of the operation section.

According to the configuration, when a user exchanges the tape in accordance with the dialogue screen, the control device acquires the status information indicating the tape width set in the print data by periodically acquiring the status information, and thus the print data is automatically transmitted due to this. In this manner, since the print data is transmitted without performing printing instructions again after the tape exchange, it is possible to save the effort of performing the printing instructions.

At least one embodiment of the disclosure, there is provided a program product that causes a computer to execute the method of controlling a print data generating device mentioned above.

According to the configuration, it is possible to cause the computer to execute the method of controlling a print data generating device mentioned above just by mounting the program to the computer.

BRIEF DESCRIPTION OF THE DRAWINGS

The invention will be described with reference to the accompanying drawings, wherein like reference numbers reference like elements.

DESCRIPTION OF EXEMPLARY EMBODIMENTS

Hereinafter, reference will be made to the accompanying drawings to describe a printing system, a print data generating device, a method of controlling the print data generating device, and a program according to the invention. In an embodiment, the printing system to which the invention is applied will be described by way of example.

Figure 1:
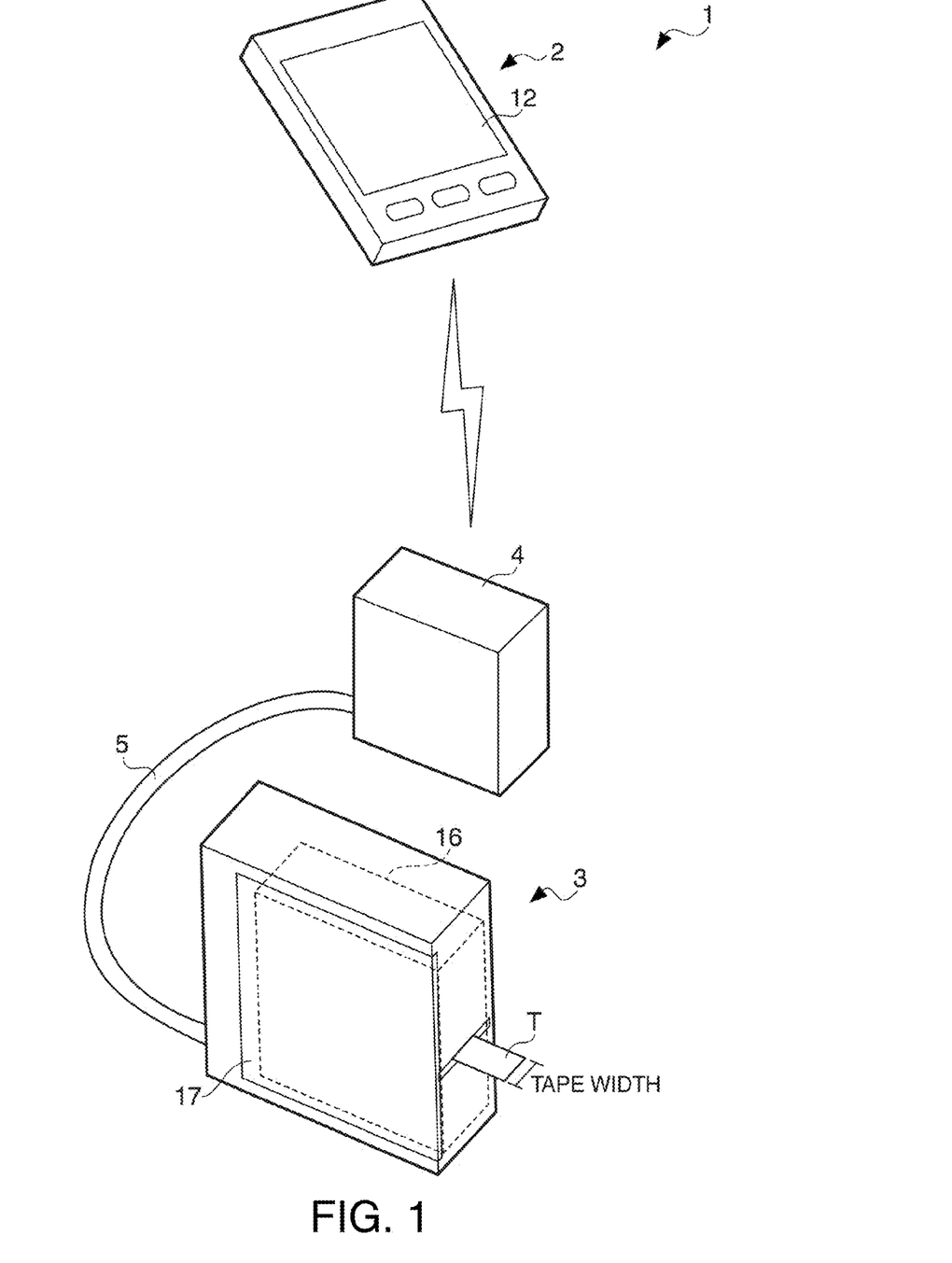
FIG. 1 is a system configuration diagram illustrating a printing system according to an embodiment of the invention.

As shown in FIG. 1, a printing system 1 is composed of a portable terminal (control device) 2 into which an application for generating print data is installed, a tape printer (printer) 3 that prints print data 62 generated on the portable terminal 2 on a print tape (tape) T, and a wireless LAN (Local Area Network) router 4. Among them, the portable terminal 2 and the wireless LAN router 4 are connected to each other in a wireless manner, and the wireless LAN router 4 and the tape printer 3 are connected to each other in a wired manner by a cable 5. Meanwhile, when the printing system 1 includes a plurality of portable terminals 2, the single tape printer 3 is configured to be capable of being commonly used by a plurality of portable terminals 2.

The tape printer 3 is configured such that a tape cartridge 16 receiving the elongated print tape T so as to be capable of reeling out the print tape T is mounted thereto, and creates a label by performing printing and cutting on the basis of the print data 62 received from the portable terminal 2 while reeling out the print tape T. An openable and closable cover 17 is provided on the lateral side of the tape printer 3, and a cartridge mounting portion for mounting the tape cartridge 16 and an open-closed detection sensor that detects opening and closing of the openable and closable cover 17 (both are not shown in the drawing) are disposed in the inner side of the openable and closable cover 17. The tape cartridge 16 is removably mounted to the cartridge mounting portion in a state where the openable and closable cover 17 is opened.

Various print tapes T having different tape types (tape width, ground color, ground pattern and material (texture) of the print tape T, or the like) are prepared, and the print tape T is received in the tape cartridge 16 corresponding to the tape type. That is, the loaded print tape T can be exchanged by replacing the tape cartridge 16, for example, the tape width of the loaded print tape T can be changed. In addition, the tape cartridge 16 is provided with a plurality of holes (not shown) for specifying the type of print tape T. On the other hand, the cartridge mounting portion is provided with a plurality of tape identification sensors (not shown) such as a micro switch that detects these bit patterns, corresponding to a plurality of holes. The tape identification sensors detect the tape types of the print tape T received in the tape cartridge 16, that is, the tape types of the print tape T loaded in the tape printer 3.

The portable terminal 2 is a general smartphone including a touch panel 12. An application for generating print data is installed to the portable terminal 2 and this application is started up, so that the corresponding portable terminal 2 functions as a print data generating device that generates the print data 62.

Figure 2:
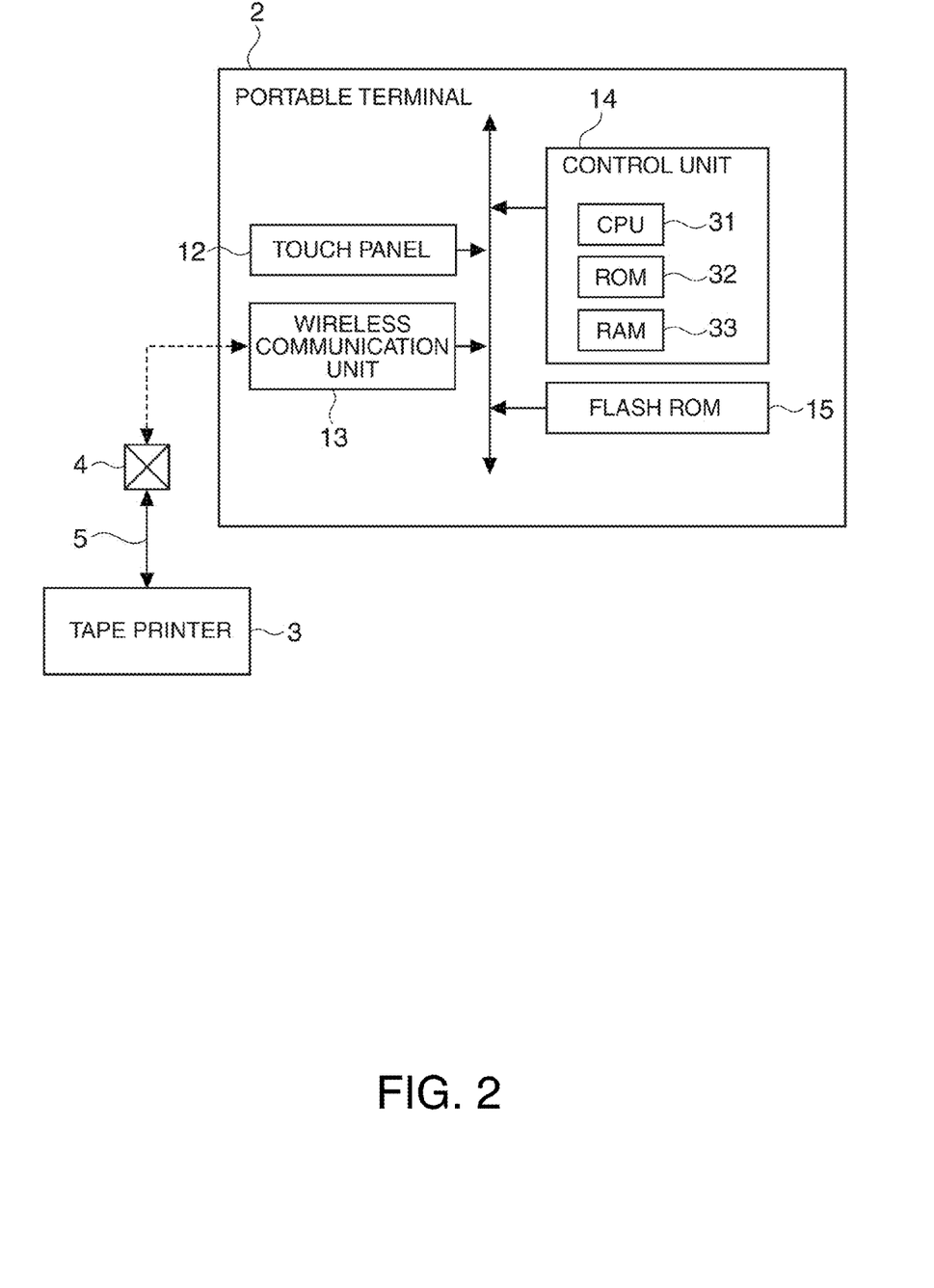
FIG. 2 is a control block diagram illustrating a portable terminal.

FIG. 2 is a control block diagram illustrating the portable terminal 2. As shown in FIG. 2, the portable terminal 2 includes the above-mentioned touch panel 12 which is a user interface, a wireless communication unit 13 that performs communication with the tape printer 3 through the wireless LAN router 4, a control unit 14 that controls the touch panel and the wireless communication unit, and a flash ROM (Flash Read Only Memory) 15 that stores various types of data.

The control unit 14 includes a CPU (Central Processing Unit) 31, a ROM (Read Only Memory) 32 and a RAM (Random Access Memory) 33. The CPU 31 is a central processing unit, and performs various types of arithmetic processing. Meanwhile, although not specifically shown, the CPU 31 includes a timer for clocking the current time. The ROM 32 stores a control program in order for the CPU 31 to perform various types of arithmetic processing, and the RAM 33 is used as a work area when the CPU 31 performs various types of arithmetic processing. The flash ROM 15 stores various types of data of the tape printer 3, and stores an application for generating print data.

Figure 3:
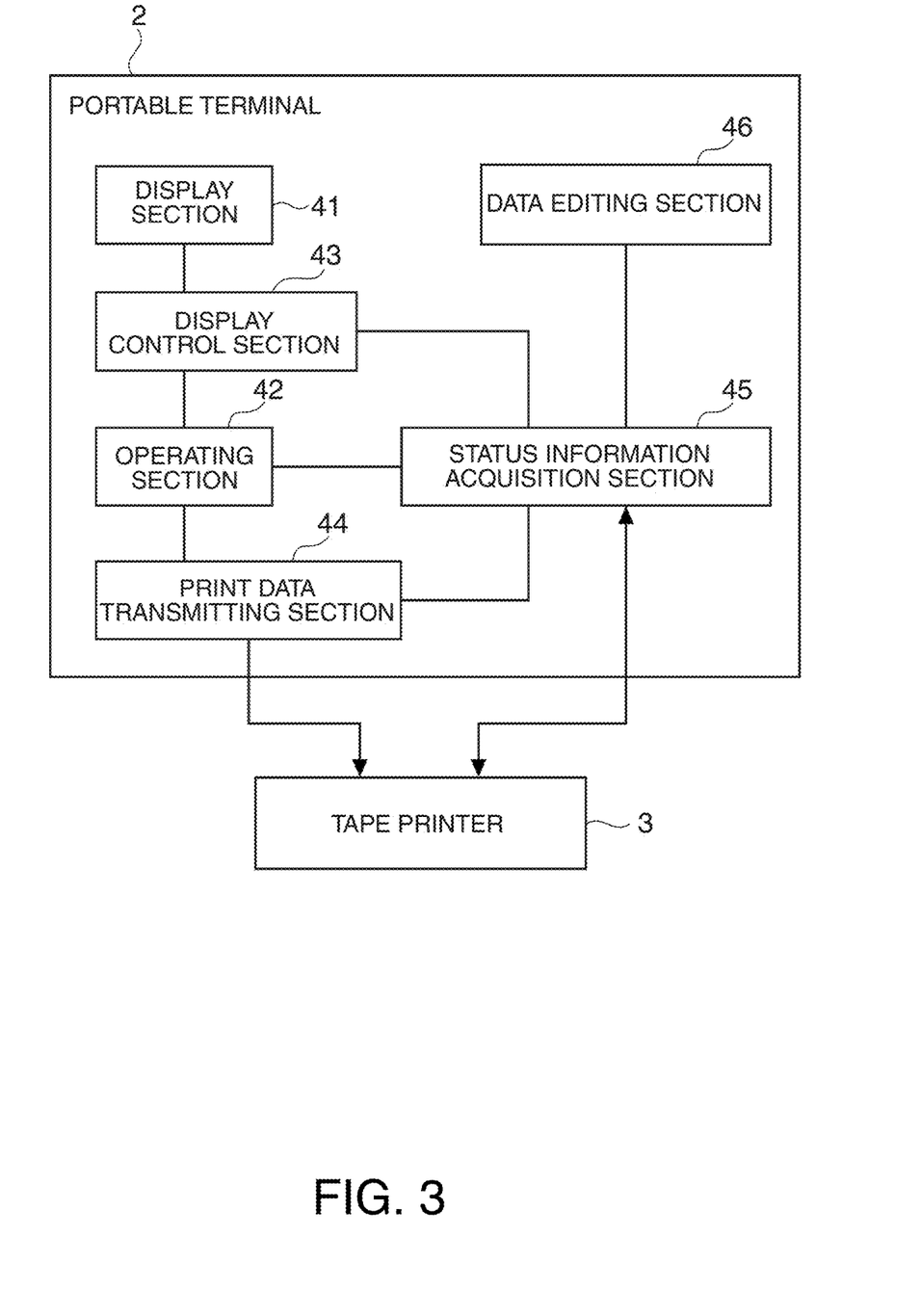
FIG. 3 is a functional block diagram illustrating the portable terminal.

Herein, a functional configuration of the portable terminal 2 will be described with reference to FIG. 3. As shown in FIG. 3, the portable terminal 2 includes a display section 41, an operation section 42, a display control section 43, a print data transmitting section 44, a status information acquisition section 45, and a data editing section 46. The display section 41 includes the touch panel 12 as a main part, and displays an editing screen A for generating and editing the print data 62. The operation section 42 includes the touch panel 12 as a main part, and is a unit for performing various operations on the edit screen A. The display control section 43 includes the control unit 14 as a main part, and performs a display control of the display section 41 in accordance with an operation of the operation section 42. The print data transmitting section 44 includes the wireless communication unit 13 as a main part, and transmits the print data 62 edited by the edit screen A to the tape printer 3.

The status information acquisition section 45 includes the wireless communication unit 13 as a main part, and periodically acquires status information of the tape printer 3. Specifically, the status information acquisition section 45 transmits a status request signal to the tape printer 3, and acquires a tape width status which is the tape width of the print tape T presently loaded in the tape printer 3 and an open-closed status indicating an open or closed state ("open" or "closed") of the openable and closable cover 17, on the basis of the status information from the tape printer 3 regarding this status request signal. Additionally, the status information acquisition section determines a power status indicating a power state ("powered on" or "powered off") of the tape printer 3, on the basis of the presence or absence of the acquisition of the status information from the tape printer 3 regarding the transmission of the status request signal. Meanwhile, although described later, the power state of the tape printer 3 is determined in accordance with the presence or absence of a response by the tape printer 3, and thus the power status is determined to be "powered off", including a case where the tape printer 3 is unable to communicate.

The data editing section 46 edits the print data 62 along with the editing operation on the edit screen A. When a specific status change (described later) occurs in the tape printer 3, setting of the tape width of the print data 62 is compulsorily changed on the basis of the tape width status acquired by the status information acquisition section 45.

Figure 4:
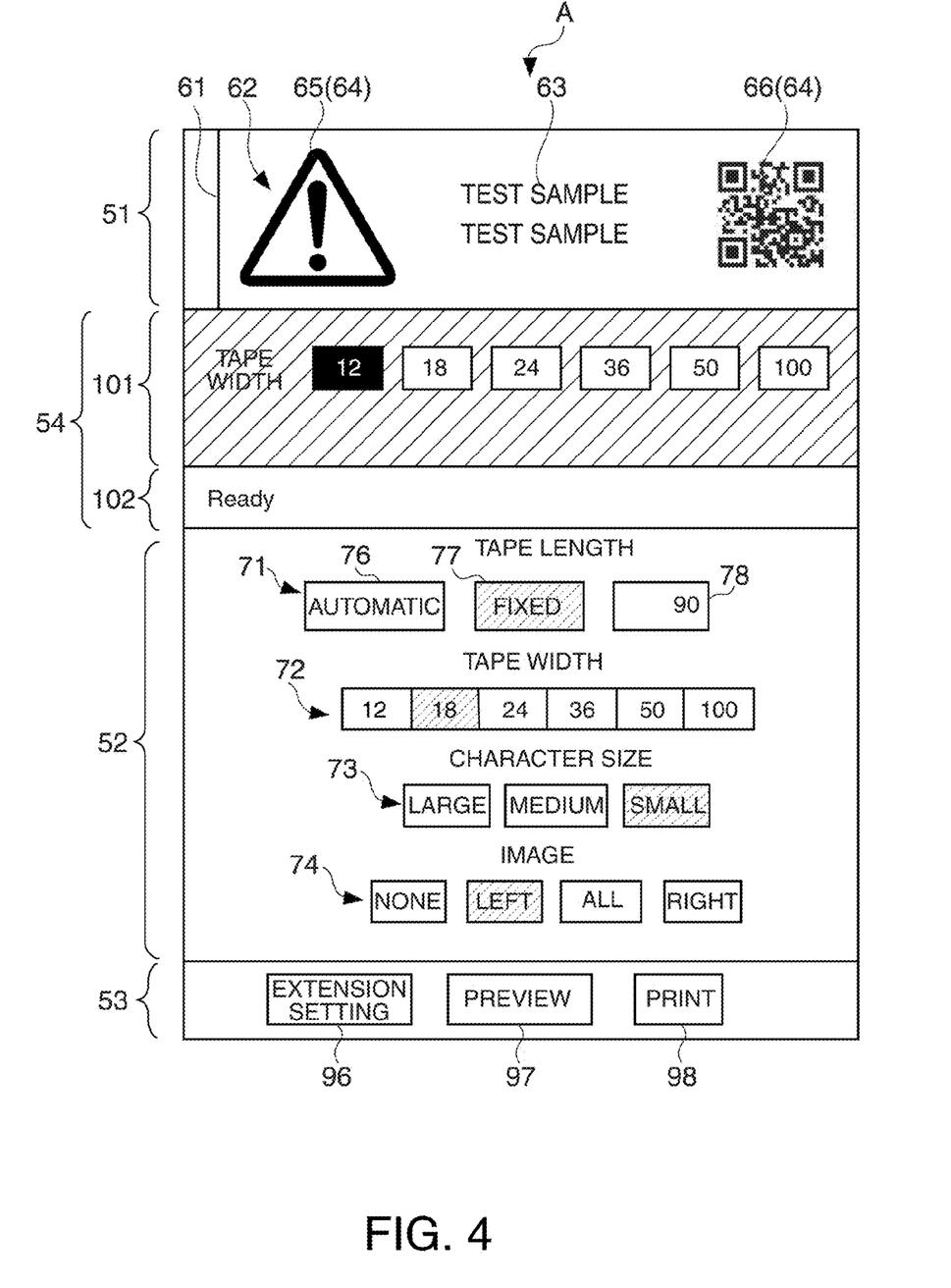
FIG. 4 is a diagram illustrating an edit screen.

Next, the edit screen A will be described with reference to FIG. 4. The edit screen A includes a preview display area 51, a status display area 54, a menu display area 52, and an operation button display area 53, from the top.

The preview display area 51 scrollably displays the print data 62 disposed on a tape image 61 which is an image of the print tape T by a flick operation. The print data 62 includes a text data 63 inserted through the edit screen A, and image data 64 inserted through the edit screen A likewise. In addition, the image data 64 includes code image data 66 indicating code information, and symbolic data 65 which is image data 64 other than the code image data 66. In the example of FIG. 4, the symbolic data 65, the text data 63 and the code image data 66 are inserted, and are disposed side by side.

The menu display area 52 displays a tape length setting menu 71, a tape width setting menu 72, a character size setting menu 73, and an image setting menu 74, from the top.

The tape length setting menu 71 includes a tape length automatic setting button 76 for automatically setting the tape length of the print data 62, a tape length fixed setting button 77 for manually setting the above-mentioned tape length to a fixed value, and a text box 78 for inputting the tape length at the time of the manual setting. When the tape length automatic setting button 76 is tapped, the portable terminal 2 sets the tape length on the basis of the print data 62. On the other hand, when the tape length fixed setting button 77 is tap-operated, an input to the text box 78 is possible, and editing (addition of blank space, changes to the character size and the character width, or the like) of the print data 62 is performed so as to become the input tape length.

In the tape width setting menu 72, the tape width of the print data 62 can be selected from "12 mm", "18 mm", "24 mm", "36 mm", "50 mm", and "100 mm".

In the character size setting menu 73, the character size of the text data 63 can be selected from "large", "medium", and "small".

In the image setting menu 74, the insert position of the symbolic data 65 can be selected from "none", "left", "all", and "right". Herein, when "left" is selected, the symbolic data 65 is left aligned (disposed at the tape front end side). In addition, when "right" is selected, the symbolic data 65 is right aligned (disposed at the tape back end side). Further, when "all" is selected, the symbolic data 65 enlarged in the tape width direction is disposed on the entire print tape T. Meanwhile, when the symbolic data 65 is not inserted, "left" or "right" is selected from the image setting menu 74, thereby allowing a predetermined symbolic data 65 to be inserted. In that case, the predetermined symbolic data 65 may be the symbolic data 65 previously selected, and may be the symbolic data 65 determined in advance. In addition, a menu for selecting the symbolic data 65 may be displayed.

The operation button display area 53 includes an extension setting button 96, a preview button 97, and a print button 98. The extension setting button 96 is a button for displaying an extension setting screen. The extension setting screen displays an image selection button for displaying an image selection screen, a QR code creation button for displaying a QR code creation screen for creating a QR code, or the like (which are not shown). The preview button 97 is a button for displaying a preview screen which displays the print data 62 printed on the tape at full scale. The print button 98 is a button for performing instructions to execute printing. That is, when the print button 98 is tap-operated, the print data 62 is transmitted to the tape printer 3 by the print data transmitting section 44.

The status display area 54 displays status information acquired by the status information acquisition section 45. Specifically, the status display area 54 includes a tape width display area 101 that displays the present tape width based on the tape width status, and a state display area 102 that displays the state of the tape printer 3 based on the open-closed status and power status. The tape width display area 101 displays the present tape width based on the tape width status by darkening the display of the tape width box, out of box indicating various tape widths, based on the tape width status. On the other hand, the state display area 102 displays the state of the tape printer 3 by selectively displaying a message ("Cover Open!") indicating that the open-closed status is "open", a message ("No Response!") indicating the power status is "powered off", that is, there is no response, and a message ("Ready") indicating that the open-closed status is "closed" and the power status is "powered on", that is, the printer is in a ready state, on the basis of the open-closed status and the power status. That is, the status information is displayed in a form such as "present tape width" and "state of the tape printer 3".

Next, a periodic operation will be described with reference to FIG. 5. The periodic operation is performed for each given period of time (for example, 3 seconds) during startup of an application for generating print data (during an editing work), and is an operation of mainly acquiring the status information from the tape printer 3 and performing a display control or data editing associated therewith.

Figure 5:
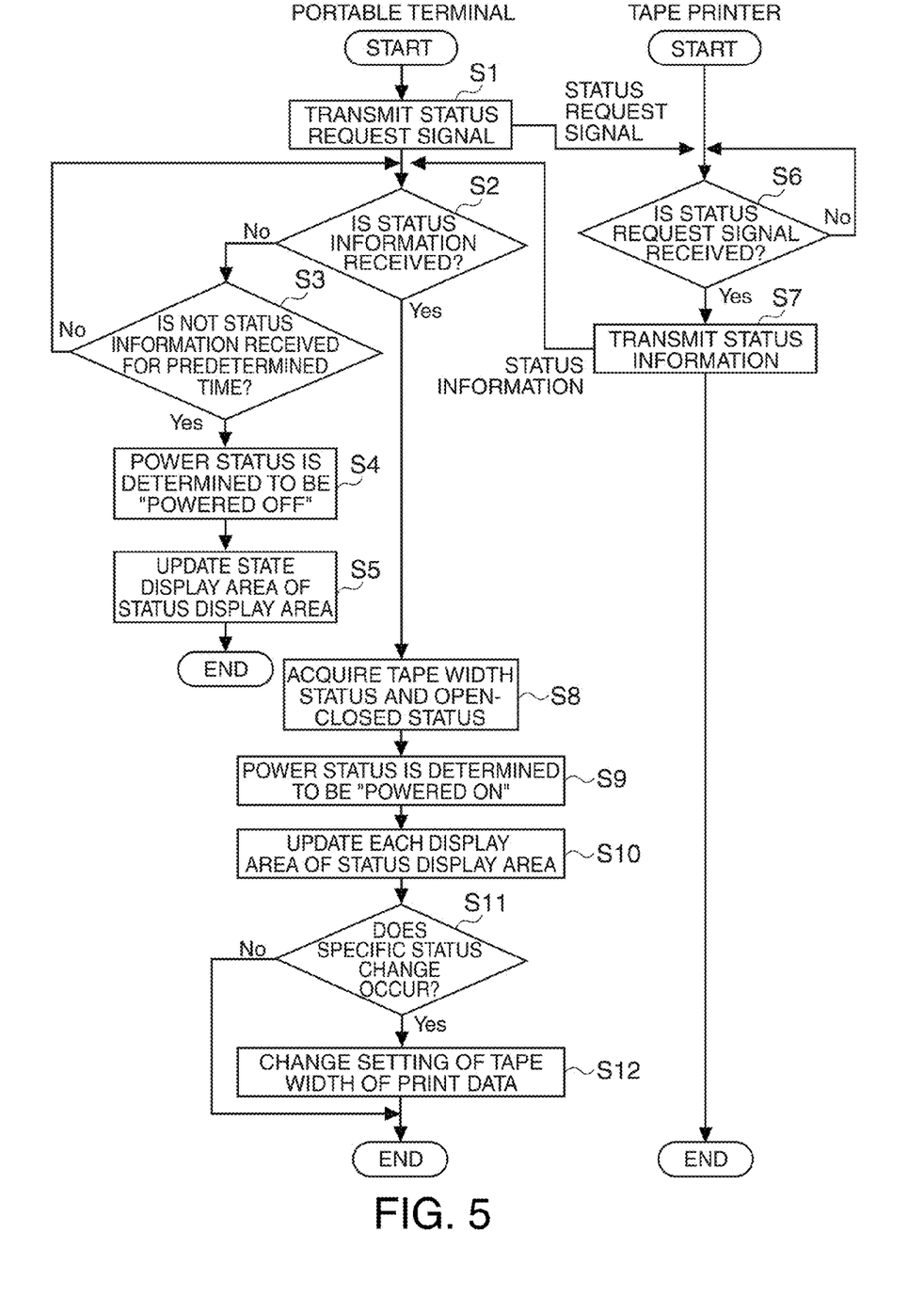
FIG. 5 is a flow diagram illustrating a periodic operation.

As shown in FIG. 5, first, the portable terminal 2 transmits a status request signal through the status information acquisition section 45 (S1). A transition to a reception standby state (S2) of the status information from the tape printer 3 is performed. In this case, when the status information from the tape printer 3 is not received for a predetermined time (for example, 1 second) or more (S3: Yes), the power status is determined to be "powered off" by the status information acquisition section 45. When the power status is determined, the state display area 102 of the status display area 54 is updated on the basis of the determined power status by the display control section 43 (S5). That is, on the state display area 102, a message "No Response!" is displayed on the display section 41. The operation is then terminated.

On the other hand, when the tape printer 3 receives the status request signal (S6: Yes), the tape printer transmits the tape width status and the opening and closing status detected by a tape type detection sensor and an open-closed detection sensor, as status information (S7). On the other hand, when the portable terminal 2 receives the status information through the status information acquisition section 45 (S2: Yes), the portable terminal acquires the tape width status and the opening and closing status from the received status information (S8: status acquisition step).

The portable terminal 2 receives the status information without the lapse of the above-mentioned predetermined time, and thus the power status is determined to be "powered on" by the status information acquisition section 45 (S9). When the status information (tape width status, opening and closing status and power status) is acquired, each of the display areas of the status display area 54 is updated on the basis of the acquired status information by the display control section 43 (S10: display control step). That is, on the tape width display area 101, the present tape width based on the acquired latest tape width status is displayed on the display section 41 (a corresponding box is darkened). On the state display area 102, the state of the present tape printer 3 based on the acquired opening and closing status and power status is displayed on the display section 41 (a corresponding message is displayed).

Subsequently, in the portable terminal 2, it is determined by the data editing section 46 whether a specific status change occurs on the basis of the acquired status information (S11). When the specific status change occurs (S11: Yes), setting of the tape width of the print data 62 is changed (S12). The specific status change includes a status change in which the opening and closing status changes from "open" to "closed", and a status change in which the power status changes from "powered off" to "powered on". That is, specifically, in consideration of the status information acquired in the previous periodic operation and the status information acquired in this periodic operation, it is determined whether the specific status change occurs depending on whether the opening and closing status or the power status changes as above (S11). When the specific status change does not occur (S11: No), this operation is terminated. On the other hand, when the specific status change occurs (S11: Yes), setting of the tape width of the print data 62 is changed (S12), and this operation is terminated. That is, even when the tape width of the print data 62 is set by an operation to the tape width setting menu 72, the tape width of the print data 62 is forced to be changed so as to fit the tape width of the print tape T presently loaded.

Figure 6:
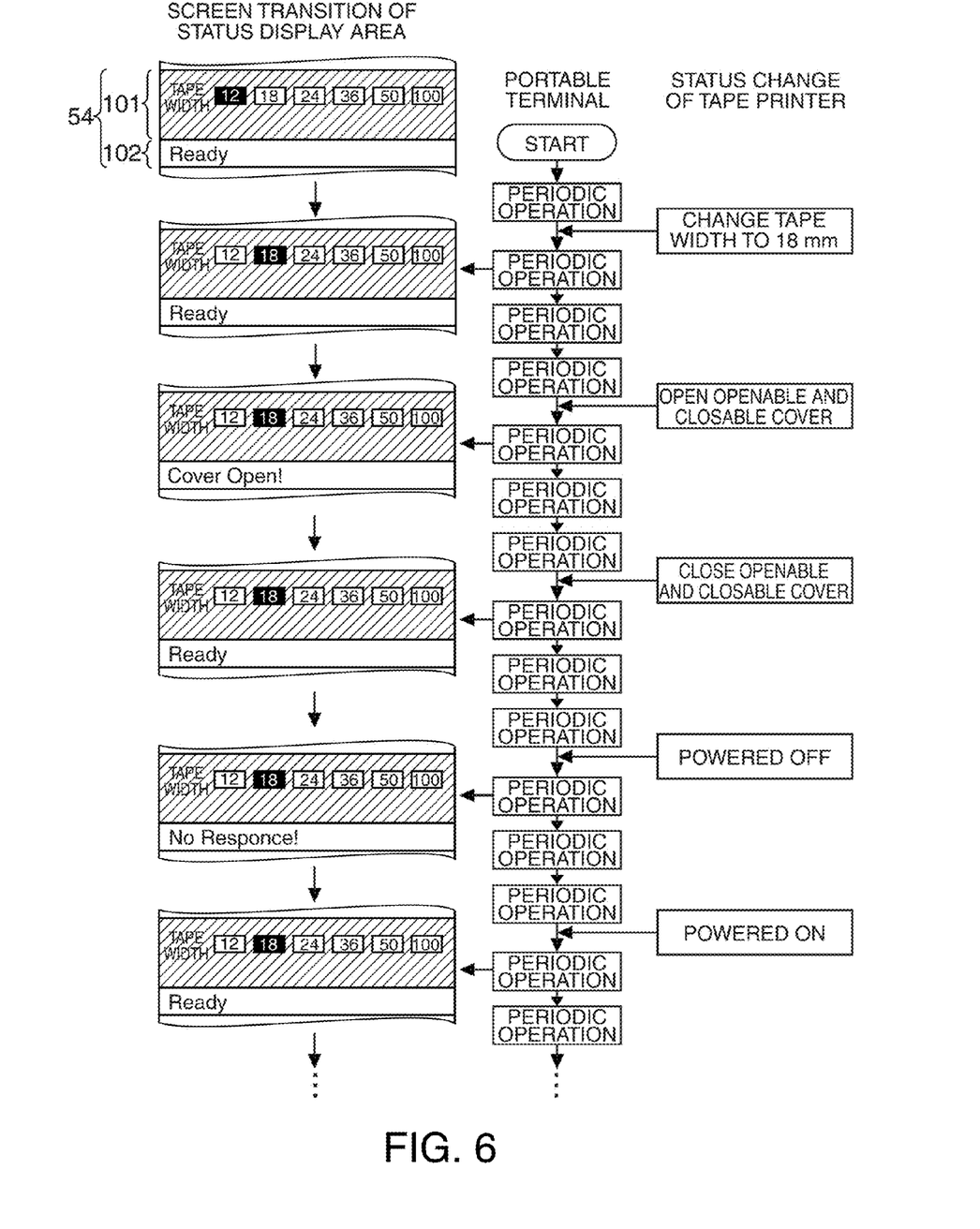
FIG. 6 is a screen transition diagram illustrating screen transition associated with the periodic operation.

Such a periodic operation is performed, and thus as shown in FIG. 6, the status display area 54 is caused to transition in tandem with an actual status change of the tape printer 3 by the display control section 43. Thereby, the portable terminal 2 always displays latest status information on the edit screen A during a user's editing work, and thus the status of the present tape printer 3 can be continued to be provided to a user.

Figure 7:
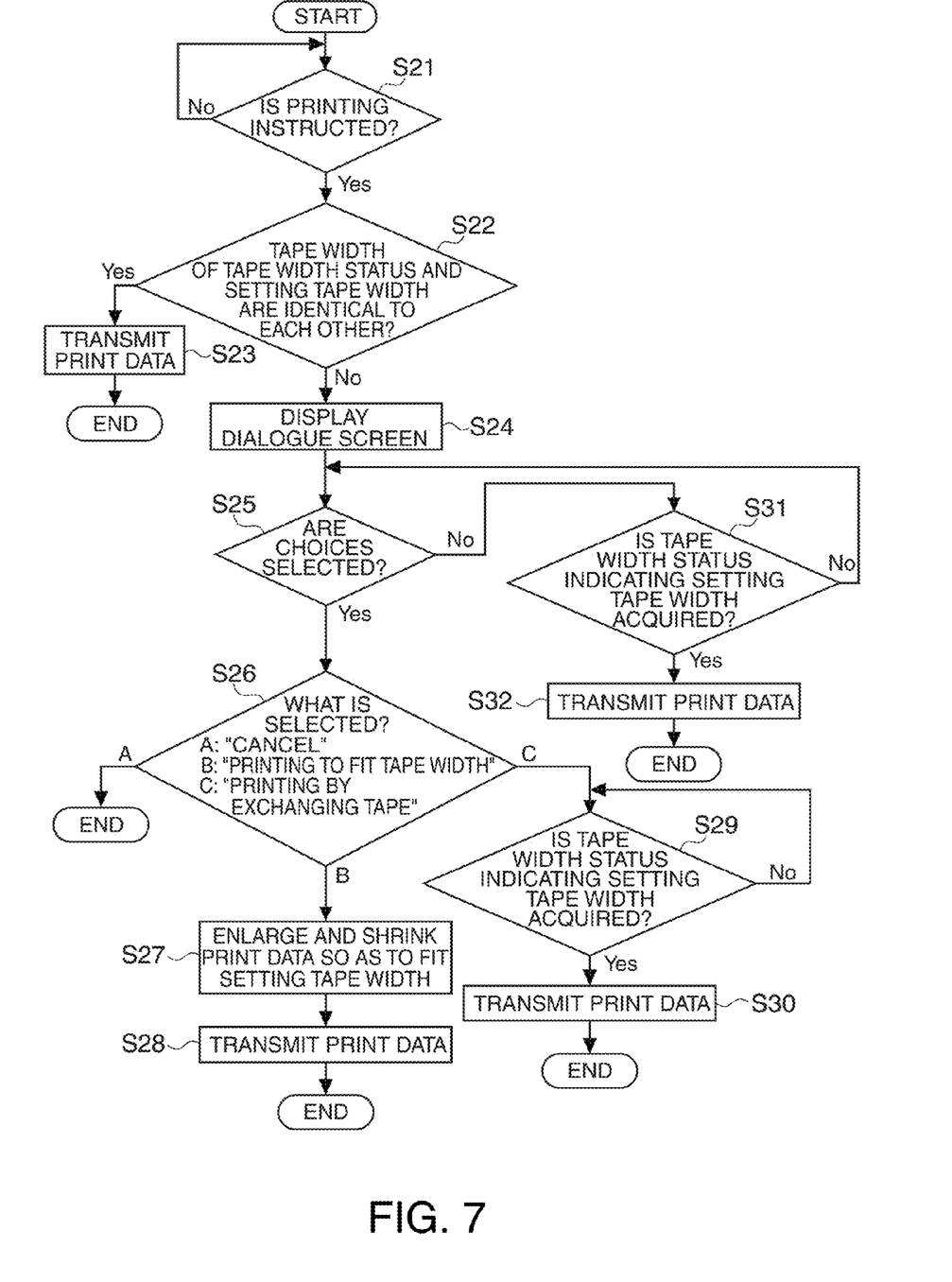
FIG. 7 is a flow diagram illustrating a printing instruction operation.

Next, a printing instruction operation will be described with reference to FIG. 7. This printing instruction operation is an operation which is executed when printing is instructed (in a precise sense, the print button 98 is tapped). As shown in FIG. 7, when the print button 98 is tapped (S21: Yes), it is determined whether the present tape width based on the tape width status acquired in the latest periodic operation and the tape width (hereinafter, called the setting tape width) set by the user's operation are identical to each other (S22). Both the tape widths are identical to each other (S22: Yes), the print data 62 is transmitted to the tape printer 3 by the print data transmitting section 44 (S23), and this operation is terminated.

Figure 8:
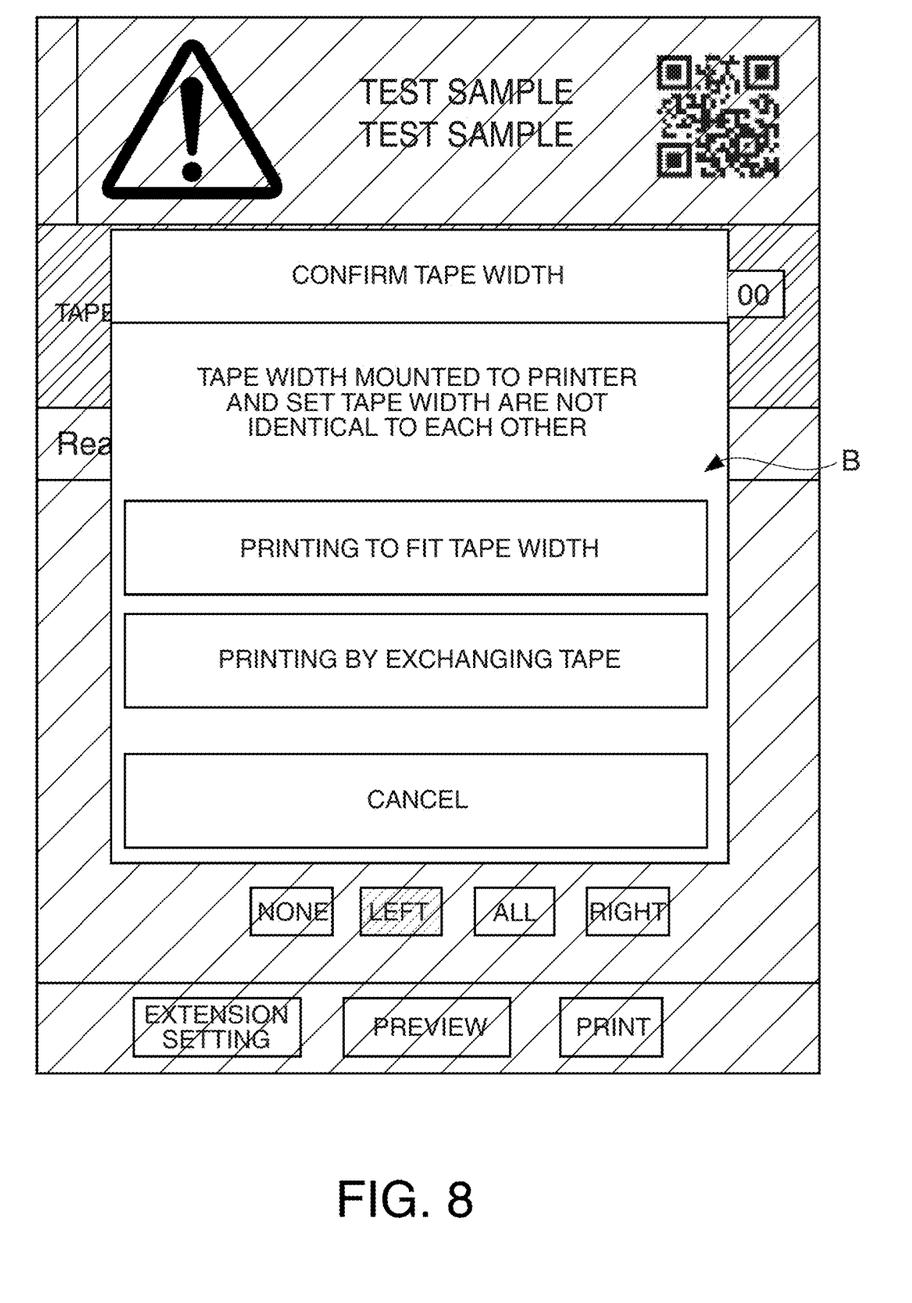
FIG. 8 is a diagram illustrating a dialogue screen.

On the other hand, when both the tape widths are not identical to each other (S22: No), a dialogue screen B that urges a tape exchange by indicating that both the tape widths are not identical to each other is displayed on the display section 41 by the display control section 43 (S24). Specifically, as shown in FIG. 8, the dialogue screen B displays a message of "the tape width mounted to the printer and the set tape width are not identical to each other.", and displays choices for selecting a countermeasure to this. Thereby, "printing to fit the tape width", "printing by exchanging the tape" and "cancel" can be selected. When "cancel" is selected (S25: Yes, S26: A), instructions to execute printing are canceled, and this operation is terminated.

On the other hand, when "printing to fit the tape width" is selected (S25: Yes, S26: B), the print data 62 is enlarged and shrunk so as to fit the tape width of the tape width status acquired in the latest periodic operation by the data editing section 46 (S27). Meanwhile, in this case, editing is performed in disregard of setting of the tape length by the user's operation. Thereafter, the print data 62 is transmitted to the tape printer 3 by the print data transmitting section 44 (S28), and this operation is terminated.

Further, when "printing by exchanging the tape" is selected (S25: Yes, S26: C), the process waits for exchange for the print tape T having the setting tape width. Specifically, the process proceeds to an acquisition waiting state (S29) in which the tape width status indicating the setting tape width (that is, tape width status having a tape width identical to the setting tape width) is waited for to be acquired by the periodic operation. When the tape width status indicating the setting tape width is acquired (S29: Yes), the exchange for the print tape T having the setting tape width is considered. Therefore, the print data 62 is transmitted to the tape printer 3 by the print data transmitting section 44 (S30), and this operation is terminated.

Even when the tape width status indicating the setting tape width is acquired (S25: No, S31: Yes) in a state where the dialogue screen B is displayed (S25), the print data 62 is transmitted to the tape printer 3 by the print data transmitting section 44 (S31), and this operation is terminated. That is, in such a case, the print data 62 is transmitted to the tape printer 3 without instructions by the operation section 42 (operation by the touch panel 12).

According to such a configuration, in the above-mentioned periodic operation, the portable terminal 2 acquires the status information including the tape width, and displays the present tape width based on the acquired latest status information on the display section 41. Therefore, this display is visually recognized, thereby allowing a user to always recognize the tape width of the print tape T presently mounted. Consequently, it is possible to prevent a label having an unintended tape width from being created.

In addition, when the specific status change occurs, the configuration is configured to change the setting of the tape width of the print data 62. Therefore, when the status change having a possibility of a tape exchange being performed is acquired, such as when the opened openable and closable cover 17 is closed or when power of the tape printer 3 is turned on, the setting of the tape width of the print data 62 can be changed.

Further, in the printing instruction operation, the dialogue screen B is displayed, and thus it is possible to prevent a printing process from being performed in a state where the tape width on the print data 62 and the actual tape width are different from each other.

Furthermore, when the tape width status indicating the setting tape width is acquired in a state where the dialogue screen B is displayed, the print data 62 is transmitted to the tape printer 3 without instructions by the operation section 42. Thereby, since the print data 62 is transmitted without performing printing instructions again after the tape exchange, it is possible to save the effort of performing the printing instructions.

Meanwhile, in the embodiment, although the specific status change includes a status change in which the opening and closing status changes from "open" to "closed" and a status change in which the power status changes from "powered off" to "powered on", only any one of them may be set to the specific status change. In addition, a status change (for example, status change in which a status indicating a connection state changes from "incommunicable" to "communicable") based on a state of communication with the tape printer 3 may be included in the specific status change.

Moreover, in the embodiment, although only the tape width of the tape types of the print tape T is acquired and displayed, other tape types (ground color, ground pattern, and material (texture) of the print tape T, or the like) may be acquired and displayed on the edit screen A.

Further, in the embodiment, although the power status and the opening and closing status of the tape printer 3 are acquired and the state of the tape printer 3 based on these statuses is displayed on the edit screen A, the power status and the opening and closing status may be displayed on the edit screen A without any change. In addition, other statuses of the tape printer 3 (for example, whether to be in a printing state, remaining amount of tape, error state, and the like) may be acquired and displayed on the edit screen A.

Furthermore, in the embodiment, when the portable terminal 2 is capable of communicating with a plurality of tape printers 3, status information of each of the tape printers 3 is acquired, and then the status information of each of the tape printers 3 may be displayed on the edit screen A together with identification information of each of the tape printers 3.

What is claimed is:

1. A printing system comprising:
    a control device configured to generate print data; and
    a printer that prints the print data transmitted from the control device on a tape,
    wherein the control device includes
        a status information acquisition section for periodically acquiring status information including a tape width of the tape loaded in the printer,
        a display section for displaying an editing screen of the print data and the status information, an operation section for instructing the printer to execute printing, and
        a display control section for performing display control of the display section, and
    wherein the display control section
        performs display control of the display section to display a present tape width based on the latest status information acquired, as the status information, on the display section,
        determines whether a tape width set in the print data and the present tape width are identical to each other when the printer is instructed to execute printing by the operation section,
        urges exchange of the tape on the display section when the tape width set in the print data and the present tape width are not identical to each other by providing an option of either printing by exchanging the tape or printing to fit the present tape width.

2. The printing system according to claim 1, wherein the control device further includes a data editing section for determining whether a specific status change occurs and changes setting of a tape width of the print data when the specific status change occurs.

3. The printing system according to claim 2, wherein the specific status change includes at least one of a status change in which a status indicating an open-closed state of an openable and closable cover for loading the tape changes from "open" to "closed", and a status change in which a status indicating a power state of the printer changes from "powered off" to "powered on".

4. The printing system according to claim 1, wherein the control unit further includes an operation section for instructing the printer to execute printing, and
    the display control section determines whether the tape width set in the print data and the present tape width are identical to each other when the printer is instructed to execute printing, and displays a dialogue screen that urges exchange of the tape on the display section when the tape width and the present tape width are not identical to each other.

5. The printing system according to claim 4, wherein when the status information indicating the tape width set in the print data is acquired in a state where the dialogue screen is displayed, the control unit further includes a print data transmitting section that transmits the print data to the printer without instructions from the operation section.

6. A print data generating device that generates print data transmitted to a printer, comprising:
    a status information acquisition section for periodically acquiring status information including a tape width of a tape loaded in the printer;
    a display section for displaying an editing screen of the print data and the status information;
    an operation section for instructing the printer to execute printing, and
    a display control section for performing display control of the display section,
    wherein the display control section
        performs display control of the display section to display a present tape width based on the latest status information acquired, as the status information, on the display section,
        determines whether a tape width set in the print data and the present tape width are identical to each other when the printer is instructed to execute printing by the operation section,
        urges exchange of the tape on the display section when the tape width set in the print data and the present tape width are not identical to each other by providing an option of either printing by exchanging the tape or printing to fit the present tape width.

7. The print data generating device according to claim 6, further including a data editing section for determining whether a specific status change occurs and changing setting of a tape width of the print data when the specific status change occurs.

8. The print data generating device according to claim 7, wherein the specific status change includes at least one of a status change in which a status indicating an open-closed state of an openable and closable cover for loading the tape changes from "open" to "closed", and a status change in which a status indicating a power state of the printer changes from "powered off" to "powered on".

9. The print data generating device according to claim 6, wherein the control unit further includes an operation section for instructing the printer to execute printing, and
    the display control section determines whether the tape width set in the print data and the present tape width are identical to each other when the printer is instructed to execute printing, and displays a dialogue screen that urges exchange of the tape on the display section when the tape width and the present tape width are not identical to each other.

10. The print data generating device according to claim 9, wherein when the status information indicating the tape width set in the print data is acquired in a state where the dialogue screen is displayed, the control unit further includes a print data transmitting section that transmits the print data to the printer without instructions from the operation section.

11. A method of controlling a print data generating device, comprising
    (a) acquiring, periodically, status information including a tape width of a tape loaded in a printer;
    (b) displaying an editing screen of print data transmitted to the printer and the status information;
    (c) controlling a display section so as to display a present tape width based on the latest status information acquired, as the status information, on the display section;
    (d) instructing the printer to execute printing;
    (e) determining whether the tape width set in the print data and the present tape width are identical to each other when the printer is instructed to execute printing;
    (f) urging exchange of the tape when the tape width and the present tape width are not identical to each other by providing an option of either printing by exchanging the tape or printing to fit the present tape width.

12. The method according to claim 11, further comprising:
    (g) determining whether a specific status change occurs; and
    (h) changing setting of a tape width of the print data when the specific status change occurs.

13. The method according to claim 12, wherein the specific status change includes at least one of a status change in which a status indicating an open-closed state of an openable and closable cover for loading the tape changes from "open" to "closed", and a status change in which a status indicating a power state of the printer changes from "powered off" to "powered on".

14. The method according to claim 11, further comprising:
    (g) instructing the printer to execute printing;
    (h) determining whether the tape width set in the print data and the present tape width are identical to each other when the printer is instructed to execute printing; and
    (i) displaying a dialogue screen that urges exchange of the tape when the tape width and the present tape width are not identical to each other.

15. The method according to claim 14, further comprising
    (j) transmitting the print data to the printer without instructions from an operation section when the status information indicating the tape width set in the print data is acquired in a state where the dialogue screen is displayed.

16. A program product embodied in at least one non-transitory computer readable medium and comprising computer instructions executable by a computer and causing a computer to execute the method of controlling a print data generating device according to claim 11.

17. A printing system comprising:
    a control device configured to generate print data; and
    a printer configured to print the print data transmitted from the control device on a tape,
    wherein the control device includes
        a status information acquisition section for periodically acquiring status information including a tape width of the tape loaded in the printer,
        a display section for displaying an editing screen of the print data and the status information,
        an operation section for instructing the printer to execute printing, and
        a display control section for performing display control of the display section, and the display control section performing display control of the display section to display a present tape width based on the latest status information acquired, as the status information, on the display section,
    wherein the display control section
        performs display control of the display section to display a present tape width based on the latest status information acquired, as the status information, on the display section,
        determines whether a tape width set in the print data and the present tape width are identical to each other when the printer is instructed to execute printing by the operation section,
        urges exchange of the tape on the display section when the tape width set in the print data and the present tape width are not identical to each other by providing an option of either printing by exchanging the tape or printing to fit the present tape width,
    wherein the status information includes a status which indicates a change of open-close state of a cover for a cartridge mounting portion.

* * * * *